United States Patent
Taya et al.

(10) Patent No.: US 9,238,743 B2
(45) Date of Patent: Jan. 19, 2016

(54) INK, INK CARTRIDGE, AND IMAGE-RECORDING METHOD

(71) Applicant: CANON KABUSHIKI KAISHA, Tokyo (JP)

(72) Inventors: Akihiro Taya, Yokohama (JP); Masahiro Terada, Hadano (JP); Hidetaka Kawamura, Yokohama (JP); Yohei Masada, Tokyo (JP); Masanobu Ootsuka, Tokyo (JP); Takaharu Aotani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/516,405

(22) Filed: Oct. 16, 2014

(65) Prior Publication Data
US 2015/0184007 A1 Jul. 2, 2015

(30) Foreign Application Priority Data
Dec. 26, 2013 (JP) ................................. 2013-269658

(51) Int. Cl.
*B41J 2/01* (2006.01)
*C09D 11/322* (2014.01)
(Continued)

(52) U.S. Cl.
CPC .................. *C09D 11/322* (2013.01); *B41J 2/01* (2013.01); *B41J 2/2107* (2013.01); *C08K 5/06* (2013.01); *C09D 11/36* (2013.01); *C09D 11/38* (2013.01); *C09D 125/08* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ............. 347/100, 95, 96, 101, 102, 20, 21, 9, 347/88, 99; 106/31.6, 31.13, 31.27; 523/160, 161
See application file for complete search history.

(56) References Cited

U.S. PATENT DOCUMENTS 6,153,001 A * 11/2000 Suzuki et al. ............... 106/31.65
2004/0114013 A1 * 6/2004 Doi ............................... 347/100
(Continued)

FOREIGN PATENT DOCUMENTS

| EP | 2028242 A1 | 2/2009 |
|---|---|---|
| JP | 2003226827 A | 8/2003 |

(Continued)

*Primary Examiner* — Manish S Shah
(74) *Attorney, Agent, or Firm* — Canon USA Inc. IP Division

(57) ABSTRACT

An ink contains a pigment dispersed with polymer, a surfactant, a water-soluble organic solvent, and water. The mass ratio of a content of the pigment to a content of the polymer in the ink is more than 3. The surfactant includes a fluorinated surfactant which is represented by Formula (1) and which has an HLB of 11 or less as determined by a Griffin method. The water-soluble organic solvent includes at least one selected from specific Group A. The total content of the water-soluble organic solvents of the Group-A in the ink is larger than the total content of water-soluble organic solvents other than the water-soluble organic solvents of Group A in the ink.

9 Claims, 1 Drawing Sheet

(51) Int. Cl.
*B41J 2/21* (2006.01)
*C09D 11/38* (2014.01)
*C08K 5/06* (2006.01)
*C09D 11/36* (2014.01)
*C09D 125/08* (2006.01)

(56) References Cited

U.S. PATENT DOCUMENTS

2004/0254264 A1* 12/2004 Suzuki et al. ............... 523/160
2007/0037901 A1* 2/2007 Kanaya et al. ............... 523/160
2009/0098312 A1* 4/2009 Goto et al. ............... 427/595
2010/0196601 A1 8/2010 Goto
2012/0306964 A1* 12/2012 Nakajima ............... 347/22
2012/0320133 A1 12/2012 Namba
2013/0258011 A1 10/2013 Boris

FOREIGN PATENT DOCUMENTS

JP 2008-095089 A 4/2008
JP 2008-095089 A1 4/2008
JP 2010222417 A 10/2010

* cited by examiner

INK, INK CARTRIDGE, AND IMAGE-RECORDING METHOD

BACKGROUND OF THE INVENTION

1. Field of the Invention

The present invention relates to an ink, an ink cartridge containing the ink, and an image-recording method using the ink.

2. Description of the Related Art

Hitherto, an ink containing a pigment (hereinafter referred to as "polymer-dispersed pigment"), dispersed with polymer, serving as a colorant has been used in an image-recording method for the purpose of increasing the abrasion resistance of images. However, the ink containing the polymer-dispersed pigment has a problem that the optical density of images is low, although the abrasion resistance of images is relatively high. Therefore, attempts have been made to increase the optical density of images in such a way that the evaporation of water is facilitated by reducing the amount of water in the ink containing the polymer-dispersed pigment and the aggregation of pigment on paper is accelerated as disclosed in Japanese Patent Laid-Open No. 2003-226827 (hereinafter referred to as the patent document). The patent document discloses ink containing the polymer-dispersed pigment and various organic agents such as a humectant and a penetrant.

SUMMARY OF THE INVENTION

An ink according to aspects of the present invention contains a pigment dispersed with polymer, a surfactant, a water-soluble organic solvent, and water. The mass ratio of a content of the pigment to a content of the polymer is more than 3. The surfactant includes a fluorinated surfactant having an HLB value of 11 or less determined by a Griffin method and represented by Formula (1):

wherein $R^1$ represents a fluorine atom or a hydrogen atom; $R^2$ and $R^3$ each independently represent a fluorine atom or a hydrogen atom, provided that at least one of $R^2$ and $R^3$ represents fluorine atom; n represents a number of 1 or more and 30 or less; and m represents a number of 1 or more and 60 or less. The water-soluble organic solvent includes at least one water-soluble organic solvent selected from Group A consisting of glycerin, ethylene glycol, diethylene glycol, polyethylene glycol with a weight-average molecular weight of 10,000 or less, 1,3-propanediol, 1,4-butanediol, and diglycerol. The total content of the water-soluble organic solvents of the Group A in the ink is larger than the total content of water-soluble organic solvents other than the water-soluble organic solvents of Group A in the ink.

According to aspects of the present invention, an ink capable of maintaining both the optical density and abrasion resistance of an image at high level can be provided. Furthermore, according to aspects of the present invention, an ink cartridge containing the ink and an image-recording method can be provided.

Further features of the present invention will become apparent from the following description of exemplary embodiments with reference to the attached drawings.

DESCRIPTION OF THE EMBODIMENTS

Figure 1:
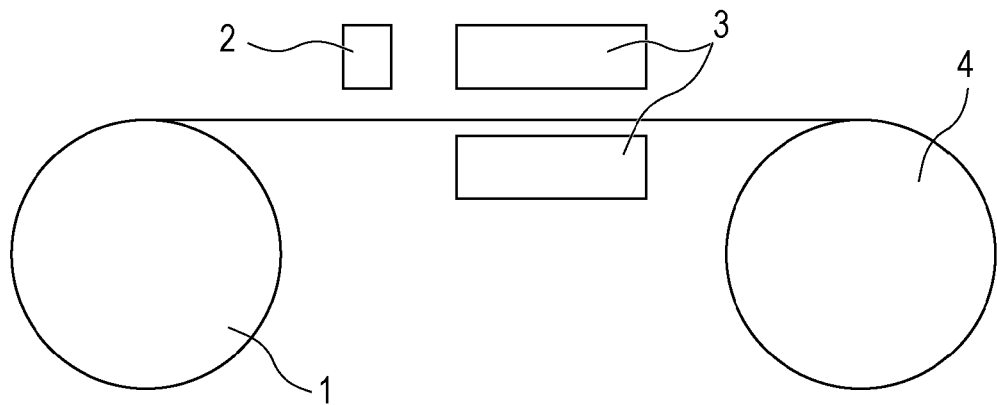
FIG. 1 is a schematic view of an exemplary image-recording apparatus used in an image-recording method according to the present invention.

The inventors have investigated the ink described in the patent document and have found that the ink provides images with certainly increased optical density, which is short of a required level. Furthermore, the inventors have found that the optical density and abrasion resistance of the images are low because the ink contains large amounts of various organic agents such as a humectant and a penetrant for the purpose of reducing the content of water in the ink.

Accordingly, it is an object of the present invention to provide an ink which contains a polymer-dispersed pigment and which can provide images with high optical density and abrasion resistance. It is another object of the present invention to provide an ink cartridge containing the ink and an image-recording method using the ink.

Aspects of the present invention will now be described in detail with reference to preferred embodiments.

The inventors have investigated a method of providing an image with high optical density and abrasion resistance using an ink containing a polymer-dispersed pigment. As a result, the inventors have appreciated the configuration of the present invention, that is, a method using ink which contains pigment, a dispersible polymer, a specific surfactant, and a specific water-soluble organic solvent; in which the mass ratio of a content of the pigment to a content of the dispersible polymer in the ink is more than 3; and in which the specific water-soluble organic solvent satisfies a specific content relationship. A mechanism in which effects of the present invention are obtained by the method is as probably described below.

The inventors have performed investigations and have found that the use of a specific fluorinated surfactant in ink more increases the optical density and abrasion resistance of images as compared to the use of other surfactants. This is probably because the specific fluorinated surfactant exhibits the effect of more reducing the contact angle of the ink with a recording medium as compared to other surfactants. The use of the specific fluorinated surfactant reduces the contact angle of the ink with the recording medium to allow the ink to spread in parallel to a surface of the recording medium. Therefore, pigment and polymer are likely to remain near a surface of the recording medium. This probably increases the optical density and abrasion resistance of an image. Investigations performed by the inventors have shown that not all fluorinated surfactants exhibit the above effect but a fluorinated surfactant having a hydrophile-lipophile balance (HLB) of 11 or less as determined by a Griffin method and represented by Formula (1) below exhibits the above effect:

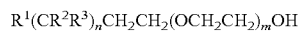

wherein $R^1$ represents a fluorine atom or a hydrogen atom; $R^2$ and $R^3$ each independently represent a fluorine atom or a hydrogen atom, provided that at least one of $R^2$ and $R^3$ represents fluorine atom; n represents a number of 1 or more and 30 or less; and m represents a number of 1 or more and 60 or less.

However, the use of the specific fluorinated surfactant only does not increase the optical density or abrasion resistance of images depending on the type of recording media in some cases. In the case of using a recording medium, such as plain paper, having high ink absorbency, pigment and polymer are unlikely to remain near a surface of the recording medium and therefore an image with high level of optical density and abrasion resistance is not obtained.

Therefore, the inventors have focused on the type of water-soluble organic solvents and have performed further investigations. As a result, the inventors have found that even in the case of using a recording medium, such as plain paper, having high ink absorbency, particles of pigment and particles of polymer can be held near a surface of the recording medium when ink contains the specific fluorinated surfactant and a specific water-soluble organic solvent and the content of the pigment in the ink is more than three times the content of a dispersible polymer in the ink. The term "water-soluble organic solvent" as used herein is at least one selected from the group consisting of glycerin, ethylene glycol, diethylene glycol, polyethylene glycol with a weight-average molecular weight of 10,000 or less, 1,3-propanediol, 1,4-butanediol, and diglycerol and is hereinafter also referred to as the "water-soluble organic solvent of Group A". From results of various experiments, the inventors have derived that the use of the water-soluble organic solvent and the fluorinated surfactant in combination increases the optical density and abrasion resistance of images. The reason why the use of the water-soluble organic solvent of Group A and the fluorinated surfactant in combination increases the optical density and abrasion resistance of images is not clear. The inventors conceive that the above reason is due to the fact that each molecule of the water-soluble organic solvent of Group A has two or more hydroxyl groups and contain carbon atoms, located at both terminals thereof, bonded to hydroxyl groups and the fact that the molecule of the water-soluble organic solvent of Group A is highly symmetric. Furthermore, the inventors conceive that when the content of the pigment is less than three times the content of the dispersible polymer, any image with high optical density is not obtained because the dispersion stability of the pigment is high and therefore the pigment is unlikely to be aggregated in the case of applying the ink to the recording medium even if the water-soluble organic solvent of Group A is used.

As a result of further investigations, the inventors have found that when the total content of water-soluble organic solvents of Group A is greater than the total content of water-soluble organic solvents other than Group A on the basis of the total mass of an ink, the effect of increasing the optical density and abrasion resistance of images is obtained at high level.

Since the ink contains the pigment and the dispersible polymer, the content of the pigment is more than three times the content of the dispersible polymer in the ink, the ink further contains the specific fluorinated surfactant and the water-soluble organic solvent of Group A, and the content of the water-soluble organic solvent of Group A and the content of a water-soluble organic solvent other than the water-soluble organic solvent of Group A are in a specific relationship as described above, particles of the pigment and particles of the dispersible polymer can be held near a surface of a recording medium independently of the type of the recording medium. Since these components work synergistically, an effect of the present invention, that is, the high optical density and abrasion resistance of images can be achieved.

Ink

An ink according to the present invention contains a polymer-dispersed pigment (hereinafter simply referred to as the "pigment"), a fluorinated surfactant (hereinafter referred to as the "surfactant represented by Formula (1)") which is represented by Formula (1) and which has an HLB of 11 or less, a water-soluble organic solvent, and water. Components which can be used in the ink according to the present invention are described below.

Polymer-Dispersed Pigment

The pigment (polymer-dispersed pigment), which is contained in the ink according to the present invention, is dispersed with polymer different from a polyurethane polymer.

Pigment

Examples of the pigment, which can be used in the ink according to the present invention, include inorganic pigments such as carbon black and organic pigments. The pigment may be known one that can be used in ink-jet inks. The content of the pigment in the ink is preferably 0.1% to 15.0% by mass and more preferably 1.0% to 8.0% by mass on the basis of the total mass of the ink. When the pigment content is less than 1.0% by mass, the optical density of images may possibly be insufficient. When the pigment content is more than 8.0% by mass, ink-jet properties such as sticking resistance cannot be sufficiently achieved in some cases.

Method of Judging Whether Pigment is Dispersed with Polymer

A method of judging whether the pigment is dispersed with polymer is as described below. A liquid, prepared by condensing or diluting the ink, having a total solid content of about 10% by mass is centrifuged at 12,000 rpm for 1 hour. This allows the water-soluble organic solvent and polymer not contributing to dispersion to be contained in a liquid layer. Therefore, a settling component containing the pigment is recovered. In the case where the settling component, which contains the pigment, contains polymer, the pigment can be judged to be dispersed with the polymer. The polymer contained in the settling component, which contains the pigment, contains polymer, as a major component contributes to dispersing the pigment and is hereinafter referred to as the "polymer dispersant". The polymer contained in the liquid layer as a major component does not contribute to dispersing the pigment.

Polymer Dispersant

The polymer dispersant, which can be used in the ink according to the present invention, may be one used in conventional ink-jet inks. In the present invention, the polymer dispersant is preferably water-soluble. In the present invention, the fact that the polymer dispersant is water-soluble means that in the case of neutralizing the polymer dispersant with an equivalent of alkali, the polymer dispersant has no particle size. Monomers used to prepare the polymer dispersant are particularly those described below. The polymer dispersant is polymer synthesized from at least two of the monomers. At least one of the monomers is preferably hydrophilic. The monomers include styrene, vinylnaphthalene, esters of α,β-ethylenic unsaturated carboxylic acids and aliphatic alcohols, acrylic acid, methacrylic acid, maleic acid, itaconic acid, fumaric acid, vinyl acetate, vinylpyrrolidone, acrylamide, and derivatives of these compounds. In particular, a hydrophilic monomer used is preferably acrylic acid or methacrylic acid. In the present invention, a copolymer having units derived from acrylic acid and units derived from methacrylic acid is particularly preferred. Examples of the copolymer include block copolymers, random copolymers, graft copolymers, and salts of these copolymers. Furthermore, a natural polymer such as rosin, shellac, or starch may be used herein.

The polymer dispersant preferably has a weight-average molecular weight of 1,000 to 30,000 and more preferably 3,000 to 15,000 as determined by gel permeation chromatography (GPC) in terms of polystyrene. In the present invention, the polymer dispersant preferably has an acid value of 50 mg-KOH/g to 350 mg-KOH/g and more preferably 80 mg-KOH/g to 250 mg-KOH/g. When the acid value of the polymer dispersant is within the above range, the dispersion stability of the pigment dispersed with the polymer dispersant is high and preferred ink ejection stability is obtained. The acid value of the polymer dispersant is determined by potentiometric titration. The content of the polymer dispersant in the ink is preferably 0.1% to 5.0% by mass and more preferably 0.5% to 3.0% by mass on the basis of the total mass of the ink. The mass ratio of a content of the pigment to a content of the polymer dispersant in the ink is preferably 0.3 or more and to 5.0 or less and more preferably 0.5 or more and 2.0 or less. In the present invention, the content of each component is based on the total mass of the ink.

In the present invention, the mass ratio of a content of the pigment to a content of the dispersible polymer in the ink is preferably more than 3. Furthermore, the content of the pigment is preferably 3.3 times or more and more preferably four times or more and ten times or less the content of the dispersible polymer.

Content of Pigment

The content of the pigment in the ink is preferably 0.1% to 5.0% by mass and more preferably 1.0% to 4.0% by mass on the basis of the total mass of the ink. When the pigment content is less than 1.0% by mass, the effect of increasing the optical density of images is not sufficiently obtained in some cases. When the pigment content is more than 4.0% by mass, sticking resistance is not sufficiently obtained in some cases.

Surfactants

The ink according to the present invention contains the fluorinated surfactant, which has an HLB of 11 or less and is represented by Formula (1) below:

$$R^1(CR^2R^3)_n CH_2CH_2(OCH_2CH_2)_m OH$$

wherein $R^1$ represents a fluorine atom or a hydrogen atom; $R^2$ and $R^3$ each independently represent a fluorine atom or a hydrogen atom, provided that at least one of $R^2$ and $R^3$ represents fluorine atom; n represents a number of 1 or more and 30 or less; and m represents a number of 1 or more and 60 or less.

As described above, the HLB of the fluorinated surfactant needs to be 11 or less as determined by the Griffin method. In the present invention, the HLB thereof is preferably 6 to 11. The HLB determined by the Griffin method is defined by "20×sum of formula weights of hydrophilic segments/molecular weight". The segment "$CH_2CH_2(OCH_2CH_2)_m OH$" in Formula (1) is used to calculate the HLB instead of the "hydrophilic segments" in the above definition.

Examples of the fluorinated surfactant, which is represented by Formula (1) and has an HLB of 11 or less, include surfactants, such as FS-3100, FS-30, FSO, and FSN-100, available from Du Pont Kabushiki Kaisha; MEGAFACE F-444 available from DIC Corporation; and DSN 403N available from Daikin Industries, Ltd.

The content of the fluorinated surfactant, which is represented by Formula (1), in the ink is preferably 0.1% to 5.0% by mass on the basis of the total mass of the ink.

In the present invention, the ink may further contain a surfactant different from the fluorinated surfactant, which is represented by Formula (1). The ink according to the present invention may further contain, for example, acetylene glycol, a nonionic surfactant produced by adding ethylene oxide to acetylene glycol, and the like. In this case, the content of the fluorinated surfactant, which is represented by Formula (1), in the ink is preferably 0.1% by mass or less on the basis of the total mass of the ink.

Water and Water-Soluble Organic Solvent

The ink according to the present invention contains water and the water-soluble organic solvent. Water used is preferably deionized water (ion-exchanged water). The content of water in the ink is preferably 50% to 90% by mass on the basis of the total mass of the ink.

The term "water-soluble organic solvent" as used herein refers to an organic solvent with a solubility of 500 g/L or more in water at 20° C. The water-soluble organic solvent may be known one that can be used in inks. Examples of the water-soluble organic solvent include alcohols, glycols, alkylene glycols, polyethylene glycols, nitrogen-containing compounds, and sulfur-containing compounds. These solvents may be used alone or in combination as required. The content of the water-soluble organic solvent in the ink is preferably 50% by mass or less and more preferably 5% to 45% by mass on the basis of the total mass of the ink.

In the present invention, the water-soluble organic solvent includes at least one selected from Group A consisting of glycerin, ethylene glycol, diethylene glycol, polyethylene glycol with a weight-average molecular weight of 10,000 or less, 1,3-propanediol, 1,4-butanediol, and diglycerol and the total content of the water-soluble organic solvent of Group A needs to be greater than the total content of water-soluble organic solvents other than Group A. Furthermore, the mass ratio of a content of the water-soluble organic solvent of Group A to the total content of the water-soluble organic solvents other than Group A is preferably 3 or more and more preferably 10 or more on the basis of the total mass of the ink.

In the present invention, the total content of the water-soluble organic solvent of Group A is preferably 50% by mass or less, more preferably 5% to 45% by mass, and furthermore preferably 10% to 40% by mass on the basis of the total mass of the ink.

Additives

In the present invention, the ink may further contain various additives such as a surfactant other than those described above, a pH adjustor, a rust preventive, a preservative, an antimildew agent, an antioxidant, a reducing inhibitor, an evaporation accelerator, and a chelating agent.

In particular, the ink preferably contain at least one selected from Group B consisting of tetritol, pentitol, hexitol, heptitol, octitol, and polyethylene glycol with a weight-average molecular weight of more than 10,000 to 100,000, the one selected from Group B being hereinafter also referred to as the "Group-B additive".

When the ink further contains the Group-B additive, ejection stability can be increased with high level of optical density and abrasion resistance maintained.

The total content of tetritol, pentitol, hexitol, heptitol, and octitol, which are included in Group B, is preferably 3% to 20% by mass and more preferably 5% to 10% by mass on the basis of the total mass of the ink. The content of the polyethylene glycol with a weight-average molecular weight of more than 10,000 to 100,000, which is included in Group B, is preferably 0.0001% to 10% by mass and more preferably 0.001% to 5% by mass on the basis of the total mass of the ink. The ink preferably has a viscosity of 2 cP to 10 cP.

Ink Cartridge

An ink cartridge according to the present invention includes an ink storage portion for storing ink. The ink according to the present invention is stored in the ink storage portion. The ink cartridge has a configuration in which the ink storage portion includes an ink storage chamber for storing liquid ink and a negative pressure-generating member accommodation chamber, accommodating a negative pressure-generating member, holding ink therein with negative pressure.

Alternatively, the ink cartridge may have a configuration in which the ink storage portion does not include the ink storage chamber for storing liquid ink and holds a total amount of ink with the negative pressure-generating member. The ink cartridge may further include a recording head in addition to the ink storage portion.

Image-Recording Method

An image-recording method according to the present invention includes an ink-applying step of applying the ink according to the present invention to a recording medium. The image-recording method preferably further includes a conveying step of conveying the recording medium and a heating step of heating the recording medium provided with the ink.

FIG. 1 is a schematic view of an exemplary image-recording apparatus used in the image-recording method. In the image-recording apparatus, recording is performed using the rolled recording medium and the recording medium is rolled again as shown in FIG. 1. The image-recording apparatus includes a recording medium-feeding means 1 that is a unit for holding and feeding the rolled recording medium, an ink-applying means 2 that is a unit for applying the ink to the recording medium, a heating means 3 that is a unit for heating the recording medium, and a recording medium-recovering means 4 that is a unit for rolling the recording medium having an image. The recording medium is conveyed with a conveyance means including a roller pair, a belt, and the like along a recording medium-conveying path indicated by a solid line and is treated with the above units. The recording medium rolled with the recording medium-recovering means 4 may be treated in such a way that the recording medium is fed to another apparatus, is cut to a desired size, and is used for bookbinding.

In the present invention, the conveying speed of the recording medium in the conveying step is preferably 50 m/minute or more and more preferably 100 m/minute or more.

In the present invention, tension is preferably applied to the conveyed recording medium. Therefore, the image-recording apparatus preferably includes a tension-applying means for generating tension. In particular, a tension-applying portion for generating tension in the recording medium or a tension-adjusting portion for adjusting the tension of the recording medium may be placed in a conveyance mechanism located between the recording medium-feeding means 1 and the recording medium-recovering means 4 as shown in FIG. 1. The application of tension to the recording medium inhibits fibers contained in the recording medium from being swollen with the water in the ink. The swelling of the fibers in the recording medium increases spaces between the fibers and therefore increases the permeation rate of the ink. The increase in permeation rate of the ink allows the ink to deeply permeate the recording medium perpendicularly to a surface of the recording medium. Therefore, the optical density of images may possibly be insufficient. Since the application of tension to the recording medium inhibits the fibers in the recording medium from being swollen with the water in the ink as described above, the reduction in optical density of an image due to the increase in permeation rate of the ink can be suppressed.

The tension applied to the recording medium is preferably 20 N/m or more. When the tension applied to the recording medium is 20 N/m or more, the fibers in the recording medium are efficiently inhibited from being swollen with the water in the ink. The tension applied to the recording medium is more preferably 30 N/m or more and further more preferably 40 N/m to 100 N/m.

The ink-applying step and the heating step are described below.

(1) Ink-Applying Step

In the present invention, the ink is applied to the recording medium in the ink-applying step. An inkjet process is preferably used to apply the ink to the recording medium. That is, the image-recording method uses the inkjet process. The inkjet process may be a so-called thermal inkjet process in which ink is discharged from discharge ports of a recording head by applying thermal energy to the ink or a so-called piezoelectric inkjet process in which ink is discharged from discharge ports of a recording head using piezoelectric elements.

A recording head used may be a so-called serial type of recording head which is moved in a direction crossing the conveying direction of a recording medium, thereby performing recording, or a so-called full line type of recording head including a plurality of nozzles arranged in a range covering the maximum width of a recording medium to be used. The recording head is preferably a full line-type inkjet recording head from the viewpoint of recording an image at high speed. The full line-type inkjet recording head preferably includes nozzle arrays arranged perpendicularly to the conveying direction of the recording medium. The full line-type inkjet recording head is preferably one of full line-type inkjet recording heads which are arranged to correspond to ink colors and which are placed in parallel to the conveying direction of the recording head.

(2) Heating Step

In the present invention, the recording medium is preferably heated in the heating step such that the surface temperature of the recording medium provided with the ink is 70° C. or higher. As used herein, the expression "the surface temperature of the recording medium provided with the ink" means the temperature of a surface of the recording medium located in a position where the recording medium is conveyed 0.5 seconds after the ink is applied to the recording medium. In particular, the temperature of a surface of a recording region X of the recording medium may be measured, the recording medium being located in a position where the recording medium is moved to a distance given by "V×0.5/60 (m)" from a position (in the case of a full-line type of inkjet recording head, a position directly under the inkjet recording head) where the ink is applied to the recording region X of the recording medium along the conveying direction of the recording medium, where V is the conveying speed (m/minute) of the recording medium. Incidentally, in an example of the present invention, the temperature of a surface of a recording medium was measured from a position about 10 cm perpendicularly away from the recording medium surface using a digital infrared temperature sensor, FT-H20, available from Keyence Corporation.

In the present invention, the surface temperature of the recording medium provided with the ink is preferably 80° C. or higher. In addition, the surface temperature thereof is preferably 140° C. or lower from the viewpoint of preventing the recording medium from being deformed by heat. A method of heating the recording medium is such a way that the front side (a side to which the ink is applied) and/or back side of the recording medium is heated using a heater or another way.

In the present invention, the recording medium may be continuously heated in the heating step before, during, and after the application of the ink to the recording medium. Before the ink is applied to the recording medium, the recording medium is preferably unheated or the surface temperature of the recording medium is preferably lower than 70° C., more preferably 60° C. or lower, and further more preferably 40° C. or lower even if the recording medium is heated.

In the heating step, the recording medium may be pressurized with, for example, a pressure roller when the recording medium is heated. Pressing the recording medium allows the fixation of an image to be enhanced. The recording medium need not be pressurized over the heating step and may be pressurized in a portion of the heating step. The recording medium may be pressurized in multiple stages. The image-recording method may further include a pressing step subsequent to the heating step.

Recording Medium

In the image-recording method, the recording medium, to which the ink is applied, may be one commonly used. Examples of the recording medium include permeable recording media such as plain paper and glossy paper; less permeable recording media such as printing paper; and non-permeable recording media such as glass, plastic, and films. The recording medium preferably has high permeability, particularly an absorption coefficient Ka of 0.3 mL/m$^2$·ms$^{1/2}$ or more with respect to water.

Figure 2:
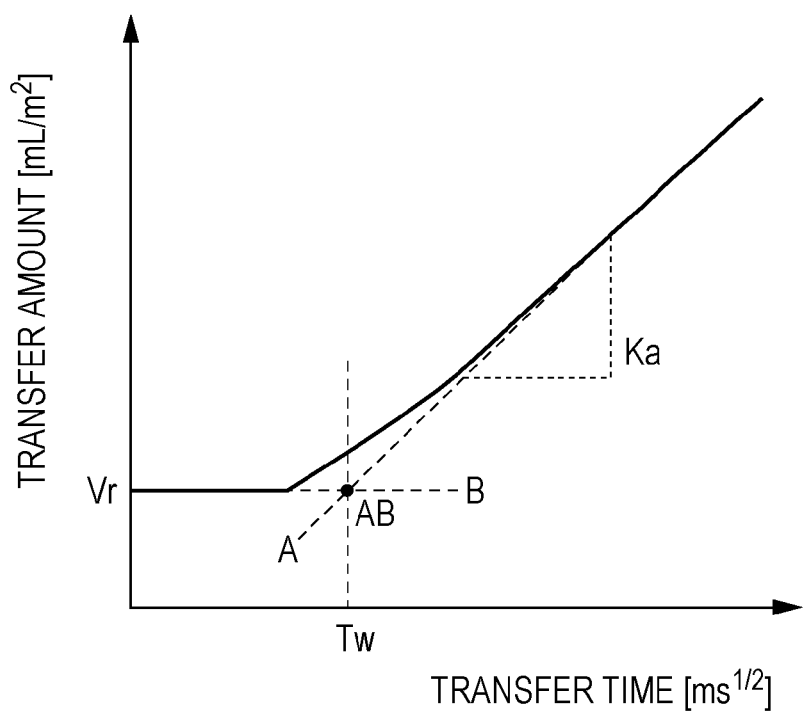
FIG. 2 is a graph showing an exemplary absorption curve illustrating the absorption coefficient Ka of a recording medium.

In the present invention, Bristow's method described in "No. 51 Method for determining the liquid absorbability of paper and board" of JAPAN TAPPI Test Methods is used to derive the absorption coefficient Ka of the recording medium. Bristow's method, which is described in many commercially available books and therefore will not be described in detail, is defined by the wetting time Tw, the absorption coefficient Ka (mL/m$^2$·ms$^{1/2}$) and the roughness index Vr (mL/m$^2$). FIG. 2 shows an exemplary absorption curve. The absorption curb shown in FIG. 2 is based on a permeation model in which a liquid begins to permeate a recording medium after the wetting time Tw from the contact of the liquid with the recording medium. The slope of a straight line after the wetting time Tw is the absorption coefficient Ka. The absorption coefficient Ka corresponds to the permeation rate of the liquid into the recording medium. As shown in FIG. 2, the wetting time Tw is determined in such a way that the intersection AB of an approximate straight line A, determined by the method of least squares, for calculate the absorption coefficient Ka and a straight line B, V=Vr, given by the transfer amount V of the liquid and the roughness index Vr and the time to the intersection AB is determined. In the present invention, the liquid infiltrated into the recording medium is 25° C. water. That is, in the present invention, Ka is the absorption coefficient with respect to 25° C. water.

The recording medium, which is used in the image-recording method according to the present invention, may be precut to a desired size. Alternatively, the rolled recording medium may be cut to a desired size after the formation of an image. The recording medium is preferably rolled as described above because tension is readily applied to the recording medium.

EXAMPLES

The present invention is further described below in detail with reference to examples and comparative examples. The present invention is not limited to the examples. In the examples, all parts are on a weight basis unless otherwise specified.

Preparation of Pigment Dispersions

Preparation of Pigment Dispersion A

A 500 mL eggplant-shaped flask equipped with a mechanical stirrer was put in a tank of an ultrasonic wave generator. To the 500 mL eggplant-shaped flask, 1 g of a dispersible polymer, that is, a styrene-acrylic acid random copolymer having an acid value of 80 mg-KOH/g, and 120 mL of tetrahydrofuran, serving as a solvent, were added, followed by ultrasonic stirring. To another container, 5 g of C. I. Pigment Blue 15:3 and 120 mL of tetrahydrofuran were added, followed by mixing using a planetary mixer available from Kurabo Industries, Ltd. until the surfaces of particles of the pigment were sufficiently wet with tetrahydrofuran. Thereafter, the mixture was added to the 500 mL eggplant-shaped flask and was well mixed with the dispersible polymer. Next, phase conversion was caused in such a way that an aqueous solution of potassium hydroxide was added dropwise to the 500 mL eggplant-shaped flask such that the degree of neutralization of the dispersible polymer was 100%, followed by premixing for 60 minutes and then dispersing for 2 hours using Nanomizer NM2-L200 AR available from Yoshida Kikai Co., Ltd., whereby a dispersion was obtained. Tetrahydrofuran was distilled off from the dispersion using a rotary evaporator and the concentration of the dispersion was adjusted, whereby Pigment Dispersion A which had a pigment content of 6.0% by mass and in which the content of the pigment was 5.0 times the content of the dispersible polymer was obtained.

Preparation of Pigment Dispersions B to D

Pigment Dispersion B, Pigment Dispersion C, and Pigment Dispersion D were prepared in substantially the same manner as that used to prepare Pigment Dispersion A except that the amount of the dispersible polymer used was 1.5 g, 2.0 g, and 2.5 g, respectively. In Pigment Dispersion B, the content of the pigment was 3.3 times the content of the dispersible polymer. In Pigment Dispersion C, the content of the pigment was 2.5 times the content of the dispersible polymer. In Pigment Dispersion D, the content of the pigment was 2.0 times the content of the dispersible polymer.

Preparation of Inks

Materials were mixed together such that the content, in mass percent, of each material was as shown in Tables 1 to 5; were sufficiently dispersed by stirring; and were filtered through a glass filter, AP 20, available from Millipore Corporation, whereby inks were prepared. In the tables, surfactants represented by Formula (1) and surfactants represented by a formula other than Formula (1) were separately described as "Formula (1)" and "other than Formula (1)", respectively. Furthermore, water-soluble organic solvents included in Group A below and water-soluble organic solvents not included in Group A were separately described as "Group A" and "other than Group A", respectively. In addition, additives included in Group B below and additives not included in Group B were separately described as "Group B" and "other than Group B", respectively.

Group A: glycerin, ethylene glycol, diethylene glycol, polyethylene glycol with a weight-average molecular weight of 10,000 or less, 1,3-propanediol, 1,4-butanediol, and diglycerol.

Group B: tetritol, pentitol, hexitol, heptitol, octitol, and polyethylene glycol with a weight-average molecular weight of more than 10,000 to 100,000.

Abbreviations for surfactants described in the tables are as described below.

Surfactants (1) Surfactants Represented by Formula (1)

(1-1) Surfactants, Represented by Formula (1), Having an HLB of 11 or less

F-444: MEGAFACE F-444, available from DIC Corporation, having an HLB of 8.5.

FSO: Zonyl FSO, available from Du Pont Kabushiki Kaisha, having an HLB of 9.5.

FS-3100: Capstone FS-3100, available from Du Pont Kabushiki Kaisha, having an HLB of 9.8

DSN403N: UNIDYNE DSN403N, available from Daikin Industries, Ltd., having an HLB of 10.0.

FS-30: Capstone FS-30, available from Du Pont Kabushiki Kaisha, having an HLB of 11.0.

(1-2) Surfactants, Represented by Formula (1), Having an HLB of More than 11

S-242: SURFLON S-242, available from AGC Seimi Chemical Co., Ltd., having an HLB of 12.0.

S-243: SURFLON S-243, available from AGC Seimi Chemical Co., Ltd., having an HLB of 15.0.

(2) Surfactants Represented by Formula Other than Formula (1)

(2-1) Fluorinated Surfactant Represented by Formula Other than Formula (1)

Ftergent 250: Ftergent 250, available from NEOS Co., Ltd., having an HLB of 10.4.

(2-1) Surfactant Other than Fluorinated Surfactant

AE100: acetylene glycol surfactant, Acetylenol E100, available from Kawaken Fine Chemicals Co., Ltd., having an HLB of 16.3.

TABLE 1

Conditions for preparing inks

| | | | | Ink 1 | Ink 2 | Ink 3 | Ink 4 | Ink 5 | Ink 6 | Ink 7 | Ink 8 | Ink 9 | Ink 10 | Ink 11 |
|---|---|---|---|---|---|---|---|---|---|---|---|---|---|---|
| Pigment | Pigment Dispersion A (pigment/dispersible polymer = 5.0) | | | 4.0 | 0 | 4.0 | 4.0 | 4.0 | 4.0 | 4.0 | 4.0 | 4.0 | 4.0 | 4.0 |
| | Pigment Dispersion B (pigment/dispersible polymer = 3.3) | | | 0 | 4.0 | 0 | 0 | 0 | 0 | 0 | 0 | 0 | 0 | 0 |
| Surfactant | Formula (1) | F-444 | HLB of 8.5 | 1.0 | 1.0 | 0 | 0 | 0 | 0 | 1.0 | 1.0 | 1.0 | 1.0 | 1.0 |
| | | FSO | HLB of 9.5 | 0 | 0 | 1.0 | 0 | 0 | 0 | 0 | 0 | 0 | 0 | 0 |
| | | FS-3100 | HLB of 9.8 | 0 | 0 | 0 | 1.0 | 0 | 0 | 0 | 0 | 0 | 0 | 0 |
| | | DSN403N | HLB of 10.0 | 0 | 0 | 0 | 0 | 1.0 | 0 | 0 | 0 | 0 | 0 | 0 |
| | | FS-30 | HLB of 11.0 | 0 | 0 | 0 | 0 | 0 | 1.0 | 0 | 0 | 0 | 0 | 0 |
| Water-soluble organic solvent | Group A | Glycerin | | 20.0 | 20.0 | 20.0 | 20.0 | 20.0 | 20.0 | 0 | 0 | 0 | 0 | 0 |
| | | Ethylene glycol | | 0 | 0 | 0 | 0 | 0 | 0 | 20.0 | 0 | 0 | 0 | 0 |
| | | Diethylene glycol | | 0 | 0 | 0 | 0 | 0 | 0 | 0 | 20.0 | 0 | 0 | 0 |
| | | Polyethylene glycol (molecular weight of 1,000) | | 0 | 0 | 0 | 0 | 0 | 0 | 0 | 0 | 20.0 | 0 | 0 |
| | | 1,3-Propanediol | | 0 | 0 | 0 | 0 | 0 | 0 | 0 | 0 | 0 | 20.0 | 0 |
| | | 1,4-Butanediol | | 0 | 0 | 0 | 0 | 0 | 0 | 0 | 0 | 0 | 0 | 20.0 |
| | Ion-exchanged water | | | 75.0 | 75.0 | 75.0 | 75.0 | 75.0 | 75.0 | 75.0 | 75.0 | 75.0 | 75.0 | 75.0 |
| Amount of water-soluble organic solvent of Group A/amount of water-soluble organic solvent other than Group A | | | | — | — | — | — | — | — | — | — | — | — | — |

TABLE 2

Conditions for preparing inks

| | | | | Ink 12 | Ink 13 | Ink 14 | Ink 15 | Ink 16 | Ink 17 | Ink 18 | Ink 19 | Ink 20 | Ink 21 |
|---|---|---|---|---|---|---|---|---|---|---|---|---|---|
| Pigment | Pigment Dispersion A (pigment/dispersible polymer = 5.0) | | | 4.0 | 4.0 | 4.0 | 4.0 | 4.0 | 4.0 | 4.0 | 4.0 | 4.0 | 4.0 |
| Surfactant | Formula (1) | F-444 | HLB of 8.5 | 1.0 | 1.0 | 1.0 | 0.5 | 0.5 | 1.0 | 0 | 0 | 1.0 | 1.0 |
| | | FSO | HLB of 9.5 | 0 | 0 | 0 | 0 | 0.5 | 0 | 0 | 0 | 0 | 0 |
| | | DSN403N | HLB of 10.0 | 0 | 0 | 0 | 0 | 0 | 0 | 1.0 | 0 | 0 | 0 |
| | | FS-30 | HLB of 11.0 | 0 | 0 | 0 | 0.5 | 0 | 0 | 0 | 1.0 | 0 | 0 |
| | Other than Formula (1) | AE100 | HLB of 16.3 | 0 | 0 | 0 | 0 | 0 | 0 | 0 | 0 | 0.1 | 0.2 |
| Water-soluble organic solvent | Group A | Glycerin | | 15.0 | 10.0 | 10.0 | 5.0 | 5.0 | 0 | 10.0 | 15.0 | 20.0 | 20.0 |
| | | Ethylene glycol | | 0 | 0 | 0 | 5.0 | 0 | 0 | 0 | 0 | 0 | 0 |
| | | Diethylene glycol | | 0 | 0 | 0 | 5.0 | 0 | 5.0 | 5.0 | 0 | 0 | 0 |
| | | Polyethylene glycol (molecular weight of 1,000) | | 0 | 0 | 0 | 0 | 0 | 5.0 | 0 | 0 | 0 | 0 |
| | | 1,3-Propanediol | | 0 | 0 | 0 | 0 | 5.0 | 0 | 0 | 0 | 0 | 0 |
| | | 1,4-Butanediol | | 0 | 0 | 0 | 0 | 5.0 | 5.0 | 0 | 0 | 0 | 0 |
| | Other than Group A | 2-Methyl-1,3-propanediol | | 5.0 | 10.0 | 5.0 | 5.0 | 0 | 0 | 5.0 | 5.0 | 0 | 0 |
| | | N-methyl-2-pyrrolidone | | 0 | 0 | 0 | 0 | 0 | 5.0 | 0 | 0 | 0 | 0 |
| | | Trimethylol propane | | 0 | 0 | 0 | 0 | 5.0 | 0 | 0 | 0 | 0 | 0 |
| | Ion-exchanged water | | | 75.0 | 75.0 | 80.0 | 75.0 | 75.0 | 75.0 | 75.0 | 75.0 | 74.9 | 74.8 |
| Amount of water-soluble organic solvent of Group A/amount of water-soluble organic solvent other than Group A | | | | 3.0 | 1.0 | 2.0 | 3.0 | 3.0 | 3.0 | 3.0 | 3.0 | — | — |

TABLE 3

Conditions for preparing inks

| | | | Inks | | | | | | | | | | |
|---|---|---|---|---|---|---|---|---|---|---|---|---|---|
| | | | Ink 22 | Ink 23 | Ink 24 | Ink 25 | Ink 26 | Ink 27 | Ink 28 | Ink 29 | Ink 30 | Ink 31 | Ink 32 |
| Pigment | Pigment Dispersion A (pigment/dispersible polymer = 5.0) | | 4.0 | 4.0 | 4.0 | 4.0 | 4.0 | 4.0 | 4.0 | 4.0 | 4.0 | 4.0 | 4.0 |
| Surfactant | Formula (1) | F-444 HLB of 8.5 | 1.0 | 1.0 | 1.0 | 1.0 | 1.0 | 1.0 | 1.0 | 1.0 | 1.0 | 1.0 | 1.0 |
| Water-soluble organic solvent | Group A | Glycerin | 20.0 | 20.0 | 20.0 | 20.0 | 20.0 | 20.0 | 20.0 | 20.0 | 20.0 | 20.0 | 20.0 |
| Additive | Group B | Tetritol | 7.0 | 0 | 0 | 0 | 0 | 0 | 0 | 0 | 0 | 0 | 0 |
| | | Pentitol | 0 | 7.0 | 0 | 0 | 0 | 0 | 0 | 0 | 0 | 0 | 0 |
| | | Hexitol | 0 | 0 | 7.0 | 0 | 0 | 0 | 0 | 0 | 0 | 0 | 0 |
| | | Heptitol | 0 | 0 | 0 | 7.0 | 0 | 0 | 0 | 0 | 0 | 0 | 0 |
| | | Octitol | 0 | 0 | 0 | 0 | 7.0 | 0 | 0 | 0 | 0 | 0 | 0 |
| | | Polyethylene glycol (molecular weight of 20,000) | 0 | 0 | 0 | 0 | 0 | 1.0 | 0 | 0 | 0 | 0 | 0 |
| | Other than Group B | Urea | 0 | 0 | 0 | 0 | 0 | 0 | 7.0 | 0 | 0 | 0 | 0 |
| | | N-methylmorpholine N-oxide | 0 | 0 | 0 | 0 | 0 | 0 | 0 | 7.0 | 0 | 0 | 0 |
| | | Xanthan gum | 0 | 0 | 0 | 0 | 0 | 0 | 0 | 0 | 0.01 | 0 | 0 |
| | | Sodium alginate | 0 | 0 | 0 | 0 | 0 | 0 | 0 | 0 | 0 | 0.01 | 0 |
| | | Polyvinyl alcohol | 0 | 0 | 0 | 0 | 0 | 0 | 0 | 0 | 0 | 0 | 0.01 |
| | | Ion-exchanged water | 68.0 | 68.0 | 68.0 | 68.0 | 68.0 | 74.0 | 68.0 | 68.0 | 75.0 | 75.0 | 75.0 |
| Amount of water-soluble organic solvent of Group A/amount of water-soluble organic solvent other than Group A | | | — | — | — | — | — | — | — | — | — | — | — |

TABLE 4

Conditions for preparing inks

| | | | Inks | | | | | | | | |
|---|---|---|---|---|---|---|---|---|---|---|---|
| | | | Ink 33 | Ink 34 | Ink 35 | Ink 36 | Ink 37 | Ink 38 | Ink 39 | Ink 40 | Ink 41 |
| Pigment | Pigment Dispersion A (pigment/dispersible polymer = 5.0) | | 0 | 0 | 4.0 | 4.0 | 4.0 | 4.0 | 4.0 | 4.0 | 4.0 |
| | Pigment Dispersion C (pigment/dispersible polymer = 2.5) | | 4.0 | 0 | 0 | 0 | 0 | 0 | 0 | 0 | 0 |
| | Pigment Dispersion D (pigment/dispersible polymer = 2.0) | | 0 | 4.0 | 0 | 0 | 0 | 0 | 0 | 0 | 0 |
| Surfactant | Formula (1) | F-444 HLB of 8.5 | 1.0 | 1.0 | 0 | 0 | 0 | 0 | 1.0 | 1.0 | 1.0 |
| | | S-242 HLB of 12.0 | 0 | 0 | 1.0 | 0 | 0 | 0 | 0 | 0 | 0 |
| | | S-243 HLB of 15.0 | 0 | 0 | 0 | 1.0 | 0 | 0 | 0 | 0 | 0 |
| | Other than Formula (1) | Ftergent250 HLB of 10.4 | 0 | 0 | 0 | 0 | 1.0 | 0 | 0 | 0 | 0 |
| | | AE100 HLB of 16.3 | 0 | 0 | 0 | 0 | 0 | 1.0 | 0 | 0 | 0 |
| Water-soluble organic solvent | Group A | Glycerin | 20.0 | 20.0 | 20.0 | 20.0 | 20.0 | 20.0 | 0 | 0 | 0 |
| | Other than Group A | 2-Methyl-1,3-propanediol | 0 | 0 | 0 | 0 | 0 | 0 | 20.0 | 0 | 0 |
| | | Diethylene glycol monobutyl ether | 0 | 0 | 0 | 0 | 0 | 0 | 0 | 20.0 | 0 |
| | | 2-Pyrrolidone | 0 | 0 | 0 | 0 | 0 | 0 | 0 | 0 | 20.0 |
| | | Ion-exchanged water | 75.0 | 75.0 | 75.0 | 75.0 | 75.0 | 75.0 | 75.0 | 75.0 | 75.0 |
| Amount of water-soluble organic solvent of Group A/amount of water-soluble organic solvent other than Group A | | | — | — | — | — | — | — | 0 | 0 | 0 |

TABLE 5

Conditions for preparing inks

|  |  |  | Ink 42 | Ink 43 | Ink 44 | Ink 45 | Ink 46 | Ink 47 | Ink 48 | Ink 49 | Ink 50 | Ink 51 |
|---|---|---|---|---|---|---|---|---|---|---|---|---|
| Pigment | Pigment Dispersion A (pigment/dispersible polymer = 5.0) | | 4.0 | 4.0 | 4.0 | 4.0 | 4.0 | 4.0 | 4.0 | 4.0 | 4.0 | 4.0 |
| Surfactant | Formula (1) F-444 | HLB of 8.5 | 1.0 | 1.0 | 1.0 | 1.0 | 1.0 | 1.0 | 1.0 | 1.0 | 1.0 | 1.0 |
| Water-soluble organic solvent | Group A | Glycerin | 0 | 0 | 0 | 0 | 5.0 | 0 | 0 | 0 | 0 | 0 |
| | | Diglycerol | 0 | 0 | 0 | 0 | 0 | 0 | 0 | 0 | 0 | 20.0 |
| | Other than Group A | 2-Methyl-1,3-propanediol | 0 | 0 | 0 | 0 | 15.0 | 10.0 | 0 | 0 | 5.0 | 0 |
| | | Diethylene glycol monobutyl ether | 0 | 0 | 0 | 0 | 0 | 0 | 5.0 | 0 | 0 | 0 |
| | | 2-Pyrrolidone | 0 | 0 | 0 | 0 | 0 | 10.0 | 0 | 10.0 | 5.0 | 0 |
| | | N-methyl-2-pyrrolidone | 20.0 | 0 | 0 | 0 | 0 | 0 | 5.0 | 0 | 0 | 0 |
| | | Hexylene glycol | 0 | 20.0 | 0 | 0 | 0 | 0 | 5.0 | 10.0 | 5.0 | 0 |
| | | Trimethylol propane | 0 | 0 | 20.0 | 0 | 0 | 0 | 5.0 | 0 | 0 | 0 |
| | | 1,2-Hexanediol | 0 | 0 | 0 | 20.0 | 0 | 0 | 0 | 0 | 5.0 | 0 |
| | Ion-exchanged water | | 75.0 | 75.0 | 75.0 | 75.0 | 75.0 | 75.0 | 75.0 | 75.0 | 75.0 | 75.0 |
| Amount of water-soluble organic solvent of Group A/amount of water-soluble organic solvent other than Group A | | | 0 | 0 | 0 | 0 | 0.3 | 0 | 0 | 0 | 0 | — |

Evaluation of Images
Preparation of Image Samples

Image Sample 1 was prepared in such a way that a 3 cm square solid image with a recording duty of 100% was recorded on a recording medium, OK Prince High Quality, available from Oji Paper Co., Ltd., having a basis weight of 64 g/cm² under conditions (the type of ink used, the surface temperature of a recording medium during the application of ink, and the tension applied to the recording medium from a tension-applying means) shown in Table 6 using an image-recording apparatus, shown in FIG. 1, equipped with a piezoelectric inkjet head, KJ4, available from Kyocera Corporation, having a nozzle density of 600 dpi. Image Sample 2 was prepared in such a way that three lines having a width of 3 mm and a recording duty of 100% and a line having a width of 17 mm and a recording duty of 100% were recorded on a recording medium, DL 9084, available from Mitsubishi Paper Mills Ltd., having a basis weight of 91 g/cm² such that the four lines were parallel to each other. Incidentally, recording conditions were as follows: a temperature of 25° C., a relative humidity of 55%, an ink ejection frequency of 39 kHz, a recording medium-conveying speed of 100 m/s, and an ink ejection volume of about 13 pL per dot during recording. In Table 6, the symbol "-" in the item "Tension applied to recording medium" means that a specific tension not less than the tension applied to a recording medium during conveying is not applied to the recording medium with the tension-applying means. In the image-recording apparatus, a condition for applying a dot to a 1/600 inch square unit region at a resolution of 600 dpi×600 dpi using a 13 ng droplet of ink is defined as a recording duty of 100%. The surface temperature of a recording medium was measured from a position about 10 cm perpendicularly away from a surface of the recording medium during the application of ink using a digital infrared temperature sensor, FT-H20, available from Keyence Corporation.

In the present invention, for evaluation standards for evaluation items below, AA to B were judged to be acceptable and C was judged to be unacceptable.

Optical Density of Images

The optical density of obtained Image Sample 1 was measured with a reflection densitometer, RD19I, available from GretagMacbeth. The optical density of each image was evaluated in accordance with evaluation standards below. Evaluation results are shown in Table 6.

AA: An optical density of 1.15 or more.
A: An optical density of 1.10 to less than 1.15.
B: An optical density of 1.00 to less than 1.10.
C: An optical density of less than 1.00.

Abrasion Resistance of Images

Within 3 minutes after Image Sample 2 was recorded, OK Top Coat Plus, available from Oji Paper Co., Ltd., having a basis weight of 105 g/cm² was put on an image and a 500 g weight was put thereon such that the contact area was 12.6 cm². Abrasion resistance testing was performed in such a way that a recording medium having Image Sample 2 recorded thereon and OK Top Coat Plus were rubbed against each other once such that the relative velocity therebetween was 10 cm/s. In this operation, the weight was set such that a contact surface of the weight passed across the recorded four lines at right angles. Thereafter, ink attached to a 12.6 cm² area of OK Top Coat Plus that was overlaid with the weight was scanned with a scanner (a multifunction device, iR3245F, available from Canon Kabushiki Kaisha; 600 dpi; a gray scale; a photographic mode) and the area fraction (ink coverage area fraction) of a portion lower than 128 of the luminance of a 256 gray scale was calculated. The abrasion resistance of images was evaluated in accordance with evaluation standards below. Evaluation results are shown in Table 6.

AA: An ink coverage area fraction of 1% or less.
A: An ink coverage area fraction of more than 1% to 3%.
B: An ink coverage area fraction of more than 3% to 5%.
C: An ink coverage area fraction of more than 5%.

Evaluation of Ejection Stability

Each ink was filled in a yellow ink tank of an inkjet printer, PX-205, available from Seiko Epson Corporation. Yellow ({R, G, B}={255, 255, 0} on an RGB 256 gray scale) image data for an A4 size image was continuously printed on ten sheets with printing quality standards, whereby image samples were obtained. The obtained image samples were visually observed and were evaluated for ejection stability in accordance with evaluation standards below. Evaluation results are shown in Table 6.

A: All ten image samples with no stripes or color unevenness.
B: Some image samples with stripes or color unevenness.

TABLE 6

Evaluation results

| Examples | Inks | Recording conditions | | Evaluation results | | |
|---|---|---|---|---|---|---|
| | | Surface temperature of recording medium during application of ink (°C.) | Tension applied to recording medium (N/m) | Optical density of image | Abrasion resistance of image | Ejection stability |
| Example 1 | Ink 1 | 25 | 0 | A | A | B |
| Example 2 | Ink 1 | 70 | 0 | AA | AA | B |
| Example 3 | Ink 1 | 25 | 20 | AA | A | B |
| Example 4 | Ink 2 | 25 | 0 | B | A | B |
| Example 5 | Ink 3 | 25 | 0 | A | A | B |
| Example 6 | Ink 4 | 25 | 0 | A | A | B |
| Example 7 | Ink 5 | 25 | 0 | A | A | B |
| Example 8 | Ink 6 | 25 | 0 | A | A | B |
| Example 9 | Ink 7 | 25 | 0 | A | A | B |
| Example 10 | Ink 8 | 25 | 0 | A | A | B |
| Example 11 | Ink 9 | 25 | 0 | A | A | B |
| Example 12 | Ink 10 | 25 | 0 | A | A | B |
| Example 13 | Ink 11 | 25 | 0 | A | A | B |
| Example 14 | Ink 12 | 25 | 0 | A | A | B |
| Example 15 | Ink 13 | 25 | 0 | B | A | B |
| Example 16 | Ink 14 | 25 | 0 | B | A | B |
| Example 17 | Ink 15 | 25 | 0 | A | A | B |
| Example 18 | Ink 16 | 25 | 0 | A | A | B |
| Example 19 | Ink 17 | 25 | 0 | A | A | B |
| Example 20 | Ink 18 | 25 | 0 | A | A | B |
| Example 21 | Ink 19 | 25 | 0 | A | A | B |
| Example 22 | Ink 20 | 25 | 0 | B | A | B |
| Example 23 | Ink 21 | 25 | 0 | B | A | B |
| Example 24 | Ink 22 | 25 | 0 | A | A | A |
| Example 25 | Ink 23 | 25 | 0 | A | A | A |
| Example 26 | Ink 24 | 25 | 0 | A | A | A |
| Example 27 | Ink 25 | 25 | 0 | A | A | A |
| Example 28 | Ink 26 | 25 | 0 | A | A | A |
| Example 29 | Ink 27 | 25 | 0 | A | A | A |
| Example 30 | Ink 28 | 25 | 0 | B | A | A |
| Example 31 | Ink 29 | 25 | 0 | B | A | A |
| Example 32 | Ink 30 | 25 | 0 | B | A | A |
| Example 33 | Ink 31 | 25 | 0 | B | A | A |
| Example 34 | Ink 32 | 25 | 0 | B | A | A |
| Example 35 | Ink 51 | 25 | 0 | A | A | B |
| Comparative Example 1 | Ink 33 | 25 | 0 | C | AA | B |
| Comparative Example 2 | Ink 34 | 25 | 0 | C | AA | B |
| Comparative Example 3 | Ink 35 | 25 | 0 | C | A | B |
| Comparative Example 4 | Ink 36 | 25 | 0 | C | A | B |
| Comparative Example 5 | Ink 37 | 25 | 0 | C | A | B |
| Comparative Example 6 | Ink 38 | 25 | 0 | C | A | B |
| Comparative Example 7 | Ink 39 | 25 | 0 | C | A | B |
| Comparative Example 8 | Ink 40 | 25 | 0 | C | A | B |
| Comparative Example 9 | Ink 41 | 25 | 0 | C | A | B |
| Comparative Example 10 | Ink 42 | 25 | 0 | C | A | B |
| Comparative Example 11 | Ink 43 | 25 | 0 | C | A | B |
| Comparative Example 12 | Ink 44 | 25 | 0 | C | A | B |
| Comparative Example 13 | Ink 45 | 25 | 0 | C | A | B |
| Comparative Example 14 | Ink 46 | 25 | 0 | C | A | B |
| Comparative Example 15 | Ink 47 | 25 | 0 | C | A | B |
| Comparative Example 16 | Ink 48 | 25 | 0 | C | A | B |
| Comparative Example 17 | Ink 49 | 25 | 0 | C | A | B |
| Comparative Example 18 | Ink 50 | 25 | 0 | C | A | B |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-269658 filed Dec. 26, 2013, which is hereby incorporated by reference herein in its entirety.

What is claimed is:
1. An ink comprising:
a pigment dispersed with polymer;
a surfactant;
a water-soluble organic solvent;
at least one additive selected from Group B consisting of tetritol, pentitol, hexitol, heptitol, octitol, and polyethylene glycol with a weight-average molecular weight of more than 10,000 and 100,000 or less; and
water,
wherein the mass ratio of a content of the pigment to a content of the polymer is more than 3;
wherein the surfactant includes a fluorinated surfactant having an HLB value of 11 or less determined by a Griffin method and represented by Formula (1):
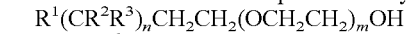
wherein, $R^1$ represents a fluorine atom or a hydrogen atom; $R^2$ and $R^3$ each independently represent a fluorine atom or a hydrogen atom, provided that at least one of $R^2$ and

$R^3$ represents fluorine atom; n represents a number of 1 or more and 30 or less; and m represents a number of 1 or more and 60 or less;

wherein the water-soluble organic solvent includes at least one water-soluble organic solvent selected from Group A consisting of glycerin, ethylene glycol, diethylene glycol, polyethylene glycol with a weight-average molecular weight of 10,000 or less, 1,3-propanediol, 1,4-butanediol, and diglycerol; and wherein the total content of the water-soluble organic solvents of the Group-A in the ink is larger than the total content of water-soluble organic solvents other than the water-soluble organic solvents of Group A in the ink.

2. The ink according to claim 1, wherein the mass ratio of the total content of the water-soluble organic solvents of the Group-A to the total content of water-soluble organic solvents other than the water-soluble organic solvents of Group A, on the basis of the total mass of the ink, is 3 or more.

3. The ink according to claim 1, wherein the content of a surfactant other than the fluorinated surfactant is 0.1% by mass or less on the basis of the total mass of the ink.

4. An ink cartridge comprising an ink storage portion for storing ink, wherein the ink stored in the ink storage portion is the ink according to claim 1.

5. An image-recording method comprising:
a conveying step of conveying a recording medium; and
an ink-applying step of applying ink to the recording medium,
wherein the ink is the ink according to claim 1.

6. The image-recording method according to claim 5, further comprising a heating step of heating the recording medium provided with the ink subsequently to the ink-applying step such that the surface temperature of the recording medium is 70° C. or more.

7. The image-recording method according to claim 5, wherein the ink is applied to the recording medium with a tension of 20 N/m or more in the ink-applying step.

8. The image-recording method according to claim 5, wherein the conveying speed of the recording medium in the conveying step is 50 m/minute or more.

9. The ink according to claim 1, wherein the polymer is synthesized from at least two of monomers, one of which is acrylic acid or methacrylic acid.

* * * * *